United States Patent [19]

Fukui

[11] Patent Number: 4,988,282
[45] Date of Patent: Jan. 29, 1991

[54] APPARATUS FOR FORMING A SEAT
[75] Inventor: Yutaka Fukui, Akishima, Japan
[73] Assignee: Tachi-S Co., Ltd., Tokyo, Japan
[21] Appl. No.: 429,421
[22] Filed: Oct. 31, 1989
[51] Int. Cl.$^5$ .............................................. B29C 37/00
[52] U.S. Cl. ................................... 425/817 R; 29/91;
249/83; 425/4 R; 425/117; 425/129.1
[58] Field of Search ................. 29/91, 91.1, 91.5, 91.7;
297/452, DIG. 1; 425/817 R, 4 R, 861, 116,
117, 129.1; 249/83

[56] References Cited
U.S. PATENT DOCUMENTS

| 4,544,126 | 10/1985 | Melchert | 249/83 |
| 4,627,664 | 12/1986 | Okazaki et al. | 297/452 |
| 4,824,070 | 4/1989 | Mizuno et al. | 425/117 X |

FOREIGN PATENT DOCUMENTS 49-76653  7/1974  Japan .

Primary Examiner—Mark Rosenbaum
Assistant Examiner—Frances Chin
Attorney, Agent, or Firm—Browdy and Neimark

[57] ABSTRACT

An apparatus for forming a seat comprising an upper die member, an intermediate die member, and a lower die member on which is placed a trim cover assembly. The intermediate die member has, formed at its inner lower area, a projection which is to close the recess of a valley or slope created in the retained area of the trim cover assembly where the upper die member is pressed against and collapses the peripheral end areas of the trim cover assembly placed on the lower die member. Further, a second projection is formed above such first one within the intermediate die member in order to from a recess in a resultant foam cushion member integral with the trim cover assembly so that a sewn jointed point and terminal end of the trim cover assembly are received in such recess, which permits a side wall portion of the trim cover assembly to be stretched neatly long the corresponding portion of the cushion member.

10 Claims, 3 Drawing Sheets

APPARATUS FOR FORMING A SEAT

BACKGROUND OF THE INVENTION

1. Field of the Invention

The present invention relates to an apparatus for manufacturing a seat including an automotive seat, and is particularly concerned with an apparatus for forming a seat, of such integral foaming type wherein a trim cover assembly and a foam base material are foamed together in a die into an integral unit of seat having an outer cover member and a foam cushion member covered integrally therewith.

2. Description of Prior Art

An integral foaming with a trim cover assembly into a certain seat, such as for example, an automotive seat, has been effected in view of easy operation requiring no adhesive, and various kinds of apparatuses therefor have been provided and known. Particularly, let us focus an apparatus having three die members for such integral foaming: As known from the Japanese Patent Laid-Open Publication No. 49-76653, basically the apparatus of this kind includes a lower die member upon which a trim cover assembly is placed, an intermediate die member having a contour similar to the body of seat, which is to be mounted upon the lower die member, wherein the trim cover assembly is retained between the lower and intermediate die members, and an upper die member which is to be mounted upon the opened side of the intermediate die member. Accordingly, a hollow is defined within those three die members, in which a foaming base material is injected and then a foaming is effected therein in order for the trim cover assembly to be integrally foamed with a foamed resultant cushion member.

A typical explanation on this sort of apparatus will be given now by referring to FIGS. 1 through 3.

As shown in FIG. 1, the apparatus comprises an upper die member (3) whose shape conforms to that of the bottom surface of a resulting seat, which is formed at its center area with an injection port (31), through which a foaming base material is to be injected, an intermediate die member (1') which in composed of three separate die pieces (1a') (1b') (1c') although not clearly shown and reference may be made to FIG. 4 from which the designation (1c') being not shown should be assumed as generally corresponding to (1c) for understanding, the die pieces (1a')(1b')(1c') being to be put togther and intended for forming a body of resulting cushion member (5'), and a lower die member (2) upon which is placed a trim cover assembly (4). The trim cover assembly (4) consists essentially of a seating surface portion (4a) and a side wall portion (4b), the seat surface portion (4a) including an outer cover member (41) made of a woven fabric or the like, a foam wadding (42) formed of a slab-type urethane foam material, and a wadding cover (43) of non-woven fabric or the like, and the side wall portion (4b) being a single cover element which covers a corresponding side wall part of a cushion member. The illustrated trim cover assembly (4) has a pair of decorative constricted parts (4c)(4c) formed in the seating surface portion (4a). The side wall portion (4b) is at its one end parts sewn with the peripheral parts of the seating surface portion (4a) at a sewn jointed point (4f), with the terminal end (4g) of the seating surface portion (4a) protruding outwardly from the sewn jointed point (4f). The lower die member (2) is, therefore, provided at its molding surface with a pair of support projections (21) (21) each being disposed in correspondence with the respective two constricted parts (4c) (4c) associated with the trim cover assembly (4), and the entire diameter or surface area of the lower die member (2) is designed relatively smaller than the outer diameter of the intermediate die member (1') as shown.

The molding surface of the lower die member (2) is formed such that its surface area is generally similar to that of the seating surface portion (4a), in order that the trim cover assembly (4), which is initially turned inside out, is placed on the lower die member (2), with the side wall portion (4b) depending around the peripheral edges of the lower die member (2), and the constricted parts (4c) (4c) being supported upon the projections (21) (21) respectively as shown.

In operation, the first step is to place the turned-over trim cover assembly (4) upon the lower die member (2) as shown in FIG. 1. The intermediate die member (1'), after having its three die pieces (1a') (1b') (1c') put together, is then pressedly placed on that lower die member (2) so that the lower contact edges (13A) (13B) of the intermediate die member (1') are pressed in place upon the peripheral edges of the lower die member (2), thereby collapsing and retaining therebetween the peripheral end areas of the seating surface portion (4a) of the trim cover assembly (4), whereupon a retained areas (4d) (4d') are defined in such peripheral end areas of the trim cover assembly (4), and therefore, as can be seen from FIGS. 1 and 2, the seating surface portion (4b) is pressingly retained at those retained areas (4d) (4d') between the contact ends (13A) (13B) of the intermediate die member (1') and the peripheral end parts of the lower die member (2). At the same time, the upper die member (3) is fitted on the upper opened side of the intermediate die member (2). Consequently, those three die members (3) (1') (2) are fitted securely together to form a unit of seat forming die having a hollow therein. Then, a base foaming material is injected through the port (31) into the hollow of thus-assembled die unit. A foaming is effected in the die unit so as to produce a foam cushion member (5') which is integral with the seating surface portion (4a) of the trim cover assembly (4), as in FIG. 2.

The above-described foaming process has been a common way, but the drawback has been with a resulting seat produced therefrom, in that an undesired projected area (P) is created at the corner of the seat as shown in FIG. 3. The reason is that, as best shown in FIG. 2, at the time when the lower contact end (13A) is pressed against the peripheral end area of the lower die member (2), the corresponding peripheral end part (at 4e) of the seating surface portion (4) are resiliently collapsed, creating the recess (at 51') at that retained area (4e) in the vicinity of the lower end of the die piece (1a'), and as such, the base foaming material, which is in a liquid form and injected in the die unit, is flowed into such recess of velley or slope (s), with the result that, after curing the base material into a foam solid body, a projected area (51') is defined at the upper corner of resultant foam cushion member (5') and due to the projected area (51'), the corresponding corner area (43) of the seating surface portion (4), which lies upon the projected area (51'), is pulled outwardly to create an undesired projection area (P) as shown in FIG. 3. It is noted here that, after curing of the base foaming material, both intermediate die and upper die members (1')

(3) are removed from the lower die member (2), and the side wall portions (4b) (4b) as well as the seating surface portion (4a) are turned back to a normal state from the inside-out state, as can be seen from FIG. 3.

Hence, in the molding or forming process above, it has been difficult to produce a given contour of seat accurately with a good curvature on its corners, and such projection area (P) has impaired the aesthetic appearance of the seat, by creating an unpleasing irregularity or wrinkles on the surface of the seat.

Further, as seen in FIG. 3, the side wall portion (4b) is not stretched neatly over the corresponding portion of the cushion member (5') due to the outwardly protrusion of the sewn jointed point (4f) and terminal end (4f) associated with the trim cover assembly (4). This results in a poor appearance of the seat.

SUMMARY OF THE INVENTION

With the above-stated drawbacks in view, it is therefore a primary purpose of the present invention to provide an improved apparatus for forming a seat which eliminates the creation of such projected area in the upper corner of the seat.

In achievement of the purpose, according to the present invention, there is employed the same seat forming apparatus as in the foregoing prior art, with an improved intermediate die member. The intermediate die member comprises three separate die pieces to be fitted together to form a die unit of the intermediate die member, like the prior art one, but each of those die pieces has a projection formed at its lower inner surface, the formation of which is such as to close the undesired recess of a valley or slope created in the retained part of the trim cover assembly where an upper die member is pressed against and collapses the corresponding part of the seating surface portion of the trim cover assembly placed on a lower die member.

Accordingly, when a base foaming material is injected into the apparatus and subject to a foaming process, the base foaming material is not injected into the recess in question due to the presence of the projection in the recess. Thus, attained is a seat with a good curvature in its corner without creation of such unpleasing protrudent part therein as found in the prior art.

It is a second purpose of the present invention to permit the side wall portion of the trim cover assembly to be stretched neatly along the corresponding portion of the cushion member.

For such purpose, in the intermediate die member, there is formed a second projection in addition to the foregoing first projection, such that the former is disposed immediately above the latter in such a manner as to form a recess in the resultant foam cushion member at a point where the terminal end and sewn jointed point associated with the trim cover assembly are folded over and disposed adjacent to the corner of the cushion member, when the integral unit of the cushion member and trim cover assembly is taken out from the die memebers.

Accordingly, in the foaming process, the resultant foam cushion member is formed with such recess at the point where the terminal end and sewn jointed point of the trim cover assembly are located blow the corner of the cushion member, receive those portions of the trim cover assembly therein, thereby permitting the side wall portion of the same to be stretched neatly from the sewn jointed point along the corresponding side portion of the cushion member.

DETAILED DESCRIPTION OF PREFERRED EMBODIMENT OF THE INVENTION

Figure 2:
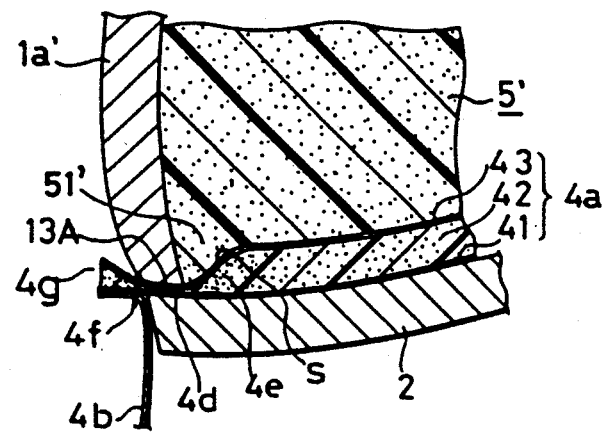
FIG. 2 is a partially enlarged sectional view of the apparatus, showing the formed part therein.
Figure 3:
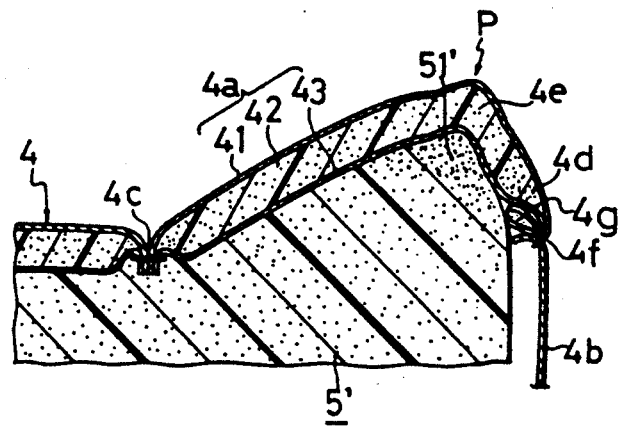
FIG. 3 is a partial sectional view of the resultant seat formed by the apparatus.

Firstly, in accordance with the present invention, the same type of the die unit and same trim cover assembly as stated in the prior art above are utilized, and excepting an intermediate die member, all the elements of the apparatus and seat basic materials are identical to those of the embodiment of the present invention to be described below. Thus, like designations in the prior art description and FIGS. 1 to 3 related thereto refer to like designations in the following description and FIGS. 4 through 10, and no restatement is made of the corresponding parts or elements between the prior art and present invention for the simplicity sake.

Referring to FIGS. 4 through 10, is illustrative of the present invention, and particularly, referring to FIGS. 4 through 7, there is shown an apparatus for forming a seat in accordance with the invention.

Figure 1:
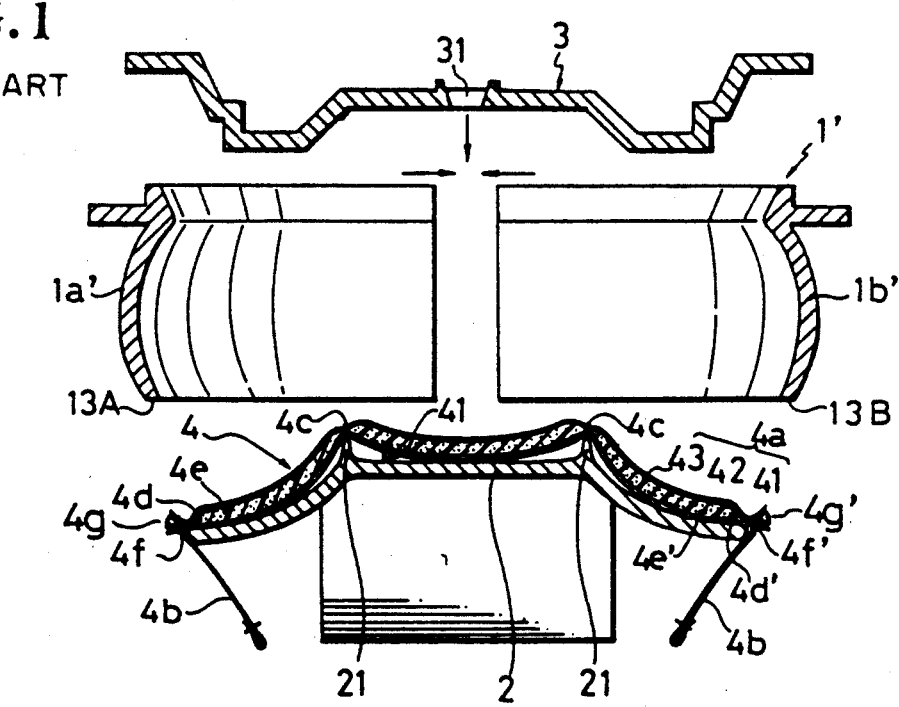
FIG. 1 is a sectional view of a conventional apparatus for forming a seat.
Figure 6:
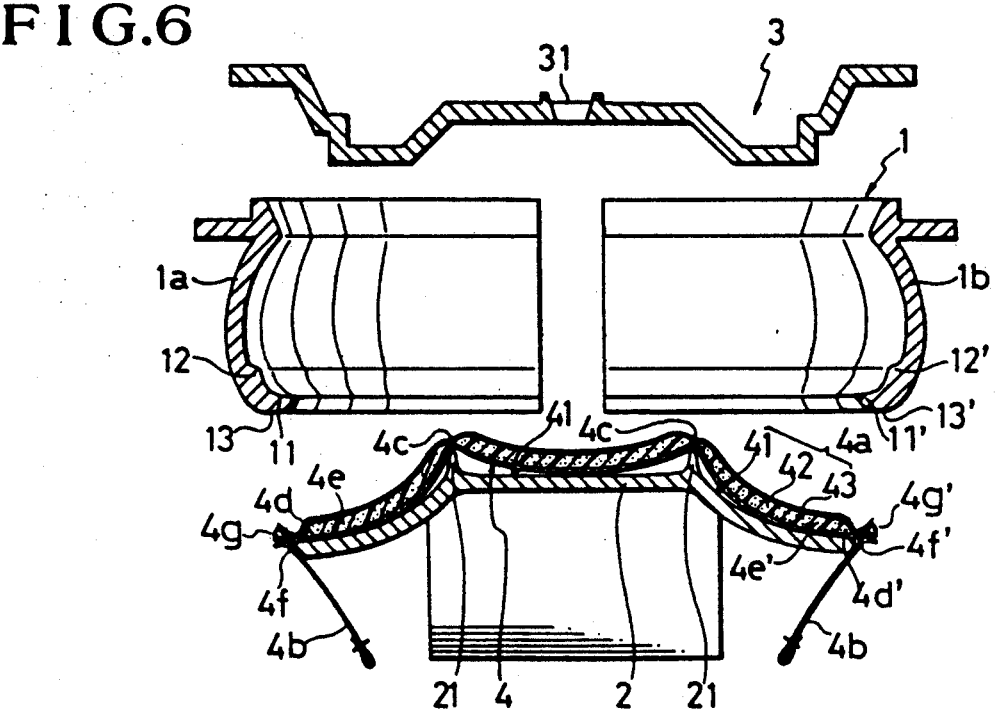
FIG. 6 is a sectional view of the apparatus.

As generally depicted in FIG. 6, the apparatus in the present invention is based on the construction as in FIG. 1, comprising the upper and lower die members (3)(2) and an improved intermediate die member (1) which forms a novel principal part of the present invention.

Figure 4:
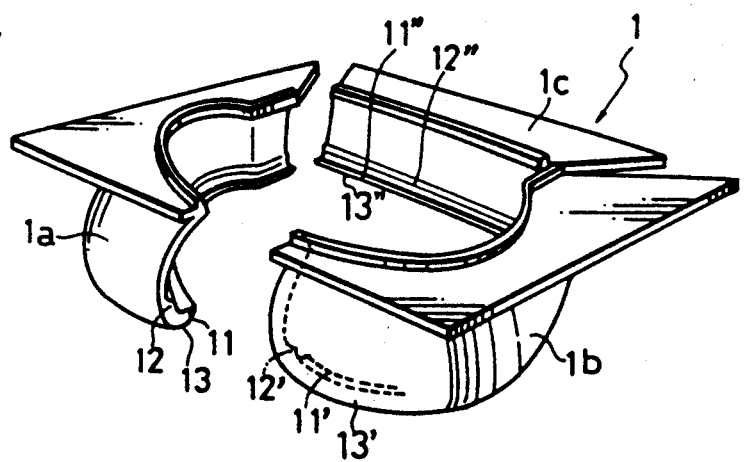
FIG. 4 is a perspective view of an intermediate die member used in an apparatus for forming a seat in accordance with the present invention.
Figure 5:
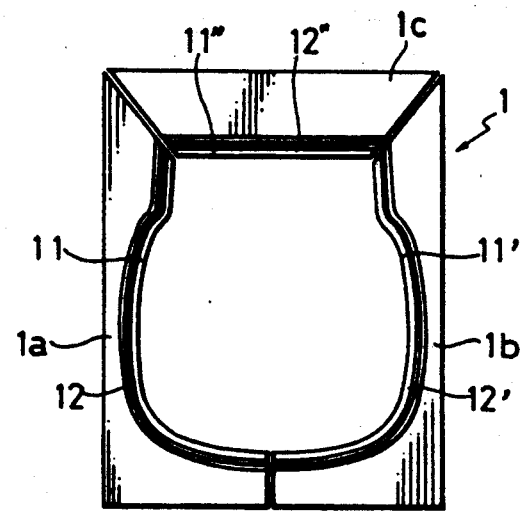
FIG. 5 is a plan view of the intermediate die member.

FIG. 4 shows the intermediate die member (1) only, which is essentially composed of a pair of side die pieces (1a)(1b) and a rearward die piece (1c), in a manner separate from one another but capable of being put together to form a unit of the intermediate die (1) having a hollow conforming in shape to the intermediate body of seat. Such separate type of die member is advantageous in easily taking out a resulting foam work therefrom, especially in view of the die having an outwardly arcuate wall as shown and thus a resulting foam work being larger than the opening of the die. FIG. 5 shows the state in which the die pieces (1a)(1b)(1c) are fitted with one another to form the intermediate die member (1).

Specifically, as viewed from FIG. 4, the leftside die piece (1a), right-side die piece (1b) and rearward die piece (1c) are formed at their respective lower ends with first inward projections (11)(11') (11") in an integral manner, the projections (11)(11') (11") being projected inwardly in regards to the intermediate die member (1) to be formed by the three die pieces (1a)(1b)(1c). Continuously from and immediate above those first projections (11)(11')(11"), there are formed second inward projections (12)(12')(12") which are expanded generally in a semi-circular shape in a direction inwardly of the intermediate die member (1). As shown in FIG. 6, at the underside of the first projections (11)(11'), are formed respectively contact ends (13)(13') to be contacted with the corresponding peripheral end parts of the lower die member (2). As shown in FIG. 4, the first projection (11") at the rearward die piece (1c) is also formed with a contact end (13") at its lower end portion. Those contact ends (13)(13')(13") are so formed as to securely press the peripheral end areas of the seating surface portion (4a) of the trim cover assembly (4) placed upon the lower die member (2), as wIll be explained later.

Figure 8:
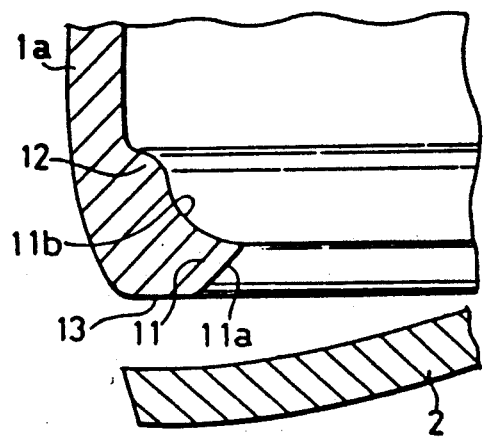
FIG. 8 is a partial sectional view of the intermediate die member and lower die member.

Referring further to FIG. 8, a more specific description is made with respect to the first and second projections (11)(11')(11")(12)(12')(12").

Because of those projections being formed in the same way, and for the sake of simplicity in description, let us elaborate only on the first and second projections (11)(12) formed at the leftside die piece (1a). The first projection (11) is formed in an appropriate shape in section which closes the undesirered recess (at (51') (in FIG. 2) of the aforementioned valley or slope (s) created by the resilient collapse of the peripheral end part (4c) of the seating surface portion (4) due to the pressure of the flat contact end (13A) of the prior-art intermediate die member (1'). For that purpose, the first projection (11) has an upturned lower surface (11a) formed continuously from the contact end (13) in a direction further inwardly thereof. Preferably, the angle at which the upturned lower surface (11a) is turned up relative to the flat contact end (13) should correspond to that at which the collapsed peripheral area (4d) assumes such slope (s) adjacently above the area (4e) to create that recess (see FIG. 2 again). The first projection (11) further has an upper concave surface (11b) formed upwardly, continously from the forward end point of the lower surface (11a). The upper concave surface (11b) is adapted for forming a smooth curvature at the corner area (51) of a resultant foam cushion member (5) as will be stated later with reference to FIGS. 9 and 10. In summary, or in other words, the first projection (11) is formed in such a tapered way that its upper surface (11b) and lower surface (11a) converges towards each other into a projected point, with a proper curvature or slope being given at the respective upper and lower surfaces (11a)(11b) for a purpose to be stated later.

The second projection (12) is formed in such a semi-circular or convex shape as to define a concave recess (52) at a point in the cushion member (5) which is located immediately below the corner area (51) as can be seen from FIGS. 9 and 10. The purpose of forming such concave recess (52) is to receive the terminal end (4g) of the seating surface portion (4) which is protruded outwardly at the sewn jointed point (4c), as will be understood later.

Now, the operation of the above-described apparatus will be described in detail hereinafter.

As shown in FIG. 6, similarly to the foregoing prior-art apparatus, the trim cover assembly (4) is turned inside out and placed on the lower die member (2), and then the intermediate die member (1), which has been assembled by fitting together the three die pieces (1a)(1b)(1c), is lowered and pressed against the lower die member (2) so that the contact ends (13)(13')(13") of the intermediate die member (1) are abutted against the corresponding peripheral edge portions of the lower die member (2), pressing and collapsing the peripheral end areas of the seating surface portion (4a), particularly at the retained area (4d, 4d'). As can be seen from FIG. 7, the trim cover assembly (4) is pressingly retained at the retained areas (4d)(4d') between the intermediate die and lower die members (1)(2) such that the sewn jointed point (4f) is disposed externally of the two mutually fitted die members (1)(2) and thus the terminal end (4g) of the seating surface portion (4a) is protruded generally horizontally from between the two die members (1)(2), while the side wall portion (4b) is dependent from the sewn jointed point (4f). This is seen best from FIG. 9, and for that purpose, it is preferable that the outer diameter of the lower die member (2) is smaller than that of the intermediate die member (1) in the illustrated manner, such as to cause the terminal end (4g) to project horizontally from the mutually-fitted intermediate die and lower die memers (1)(2).

The upper die member (3) is securely fitted in the upper opened side of the intermediate member (1). Thus, a hollow is provided within the thus-assembled three die members (1)(2)(3), and then, a base foaming material in liquid form is injected through the port (31) of the upper die member (3) into the hollow and filled therein. A foaming process is carried out under such condition to produce the foam cushion member (5) integral with the seating surface portion (4a), as shown in FIG. 7.

Figure 9:
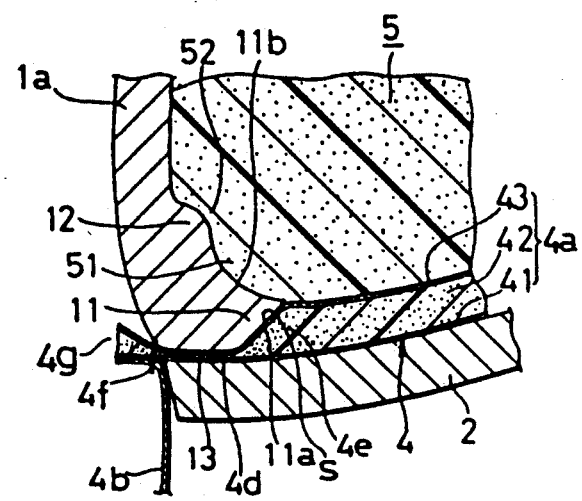
FIG. 9 is a partial sectional view of the intermediate and lower die members, showing the formed part of a resultant seat.

As a result, only viewing one side of the die members at work as in FIG. 9, the upper corner area of the resultant foam cushion member (5) is formed such that the properly curved corner part (51) is defined at the upper concave surface (11a) of the first projection (11) and further the concave recess (52) is defined at the convexly projected second projection (12). It should be understood here that such corner formation is also done at the other two first and second projections (11')(11")(12')(12"), so that the whole upper corner area of the cushion member (5) is formed with those curved corner part and concave recess.

At this point, it is seen that the peripheral end areas (4d)(4e) and terminal end (4g) of the seating surface portion (4) are isolated by the first and second portions (11)(12) from the cushion member (5) and thus not formed integrally therewith.

Figure 7:
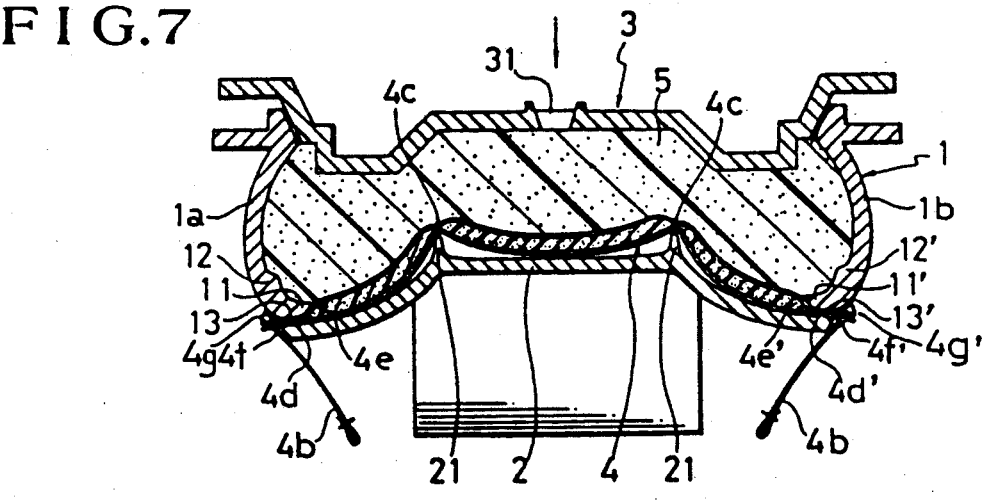
FIG. 7 is a sectional view of the same apparatus, showing the sate wherein a seat is formed therein.

Thereafter, the upper die member (3) is removed from the intermediate die memeber (1) and then the three die pieces (1a)(1b)(1c) forming the intermediate die member (1) are separated from one another, whereupon, though not shown, an integral unit of trim cover assembly (4) and foam cushion member (5) are placed on the lower die member (2) in an inverted manner, as can be assumed from FIG. 7. The collapsed area (4d) of the seating surface portion (4) is recovered to its original shape due to the resilient property of the wadding (42) therein. (see FIG. 10 for understanding)

Then, the resulting integral unit is taken from the lower die member (2) and turned over into a normal seat figure with the trim cover assembly (4) facing upwardly and the seat cushion lying therebeneath.

Figure 10:
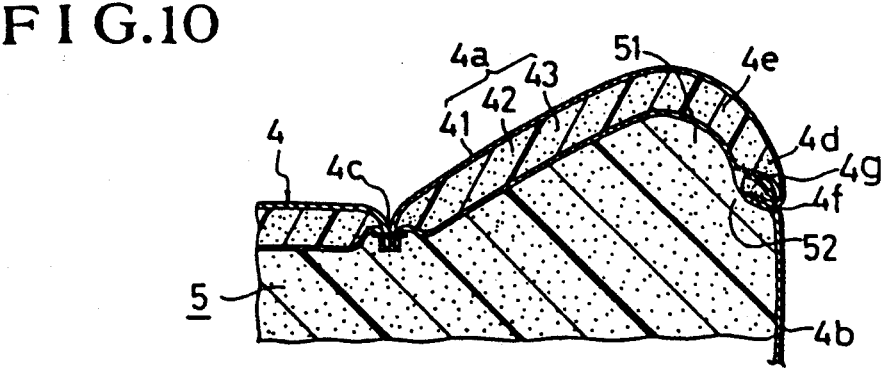
FIG. 10 is a partial sectional view of the resultant seat formed by means of the present invention.

Next, by referring to FIGS. 9 and 10, the side wall portion (4b) is pulled downwardly along the corresponding side wall of the cushion member (5), at which time, the terminal end (4g) is folded inwardly and the peripheral end areas (4d)(4e) are juxtposed upon the curved surface of the corner area (51) of the cushion member (5). The folded terminal end (4g) is received in the concave recess (52) of the cushion member (5), as shown in FIG. 10.

Accordingly, it is appreciated that the upper corner of the resultant seat, as in FIG. 10, is finished well, presenting a good curvature without unpleasing projection or deformation therein.

From the descriptions above, according to the present invention, the undermentioned advantageous effects are found:

(i) The formation of the first projections (11) (11')(11") at the lower end of the intermediate die member (1) serves to close the recess (at 51) in the valley or slope (s) created at the retained area (4e) of trim cover assembly (4) by the straight or simply formed prior-art intermediate die member (1'). The injected base foaming material is not flowed into that recess. Thus, such undesired projection (P) as found in the prior art is not formed and a good natural or smooth curved contour of the seat is attained assuredly.

(ii) Since the periperal end areas of the seating surface portion (a) as well as the side wall portion are merely attached over the corner areas and side walls of the cushion member (5), neither bonded thereto nor formed integrally therewith, a slidable layer structure is attained in the corner portion between the trim cover assembly (4) and cushion member (5) and therefore, no deformation or no wrinkle is caused due to the local non-bonded or uneven bonded state therebetween.

(iii) A variation in the formation of the first and second projections (11, 11', 11" and 12, 12', 12") permits for forming a desired curvature in the upper corners of the cushion member.

While having described the present invention as above, it should be understood that the invention is no limited to the illustrated embodiment but any other modifications, replacements and additions may structurally be possible without departing from the scopes and spirits of the appended claims. As stated above, the shape of the first and second projections in the intermediate die member may be formed in any desired shape so as to enable the creation of different aesthetical curvatures in the corners of the cushion member.

What is claimed is:

1. An apparatus for forming a seat, comprising:
   a lower die means on which a trim cover assembly is placed, said trim cover assembly including an outer cover member and a foam wadding;
   an intermediate die means mounted on said lower die means to retain a peripheral end portion of said trim cover assembly between said intermediate die means and lower die means to define a retained area in said peripheral end portion, wherein said intermediate die means is provided at its lower end with a contact end for contact upon and pressingly retaining said peripheral end portion of said trim cover assembly against said lower die means, and further provided with a projection which extends continuously from said contact end in a direction inwardly of said intermediate die means, and terminates in a projected point disposed above a heightwise thickness of said padding of said trim cover assembly, whereupon said projection constitutes an inwardly directed lower edge of said intermediate die member;
   an upper die means mounted on said intermediate die means;
   said intermediate and upper die means cooperating to provide a means for forming a foam cushion member so that said lower, intermediate and upper die means are put together to define a hollow therewithin as well as above said trim cover assembly so that foaming may be effected in said hollow to thereby form said foam cushion member integrally with said trim cover assembly.

2. The apparatus of claim 1, wherein said projection is formed with a surface conforming in shape to a recess shaped in a slope created in said retained area of said peripheral end portion of said trim cover assembly, said recess being created due to pressure of said intermediate die means upon said retained area associated with said trim cover assembly.

3. The apparatus of claim 1, wherein said projection is formed in a tapered way so that its upper surface and lower surface converge towards said projected point, and wherein said lower surface conforms to a recess of a slope created in said retained area of said peripheral end part of said trim cover assembly, said recess being created due to pressure of said intermediate die means upon said retained area associated with said trim cover assembly.

4. The apparatus of claim 3, wherein said upper surface of said projection is formed in a concave manner, whereby a corner area of said foam cushion member is formed in a curved shape by means of said upper surface of said projection, when said foaming is effected upon putting together said upper, intermediate and lower die means.

5. The apparatus as defined in claim 1, wherein said first projection is formed in a tapered way so that its upper surface and lower surface converge towards each other to said projected point, wherein said lower surface conforms to a recess of a slope which created in said retained area of said peripheral end portion of said trim cover assembly, said recess being created due to pressure of said intermediate die means upon said retained area of said trim cover assembly, and wherein said second projection is disposed above said upper surface of said first projection.

6. The apparatus of claim 5, wherein said upper surface of said first projection is formed in a concave manner, whereby a corner area of said foam cushion member is formed in a curved shape by means of said upper surface of said projection when said foaming is effected upon putting together said upper, intermediate and lower die means, and wherein said projection is defined immediately above and continuously from said upper surface of said first projection.

7. The apparatus of claim 1, wherein said intermediate die means comprises three separate die pieces which may be fitted together and separated from one another, each of said pieces having a side wall of an outwardly arcuate section, and wherein said upper die means is formed with an injection port through which a base foaming material is injected.

8. An apparatus for forming a seat, comprising:
   a lower die means on which a trim cover assembly is turned inside out and placed, said trim cover assembly comprising a seating surface portion and side wall portion, such that said seating surface and side wall portions are sewn together at their respective end parts to define a sewn jointed point between them, and so that a terminal end of said seating surface portion projects outwardly from said sewn jointed point;
   an intermediate die means mounted on said lower die means to retain a peripheral end portion of said trim cover assembly between said intermediate die means and lower die means to define a retained area in said peripheral end portion of said trim cover assembly such that, when said intermediate die means is mounted on said lower die means, said sewn jointed portion of said trim cover assembly is disposed out of said retained area external of said intermediate and lower die means, thereby exposing said terminal end of said seating surface portion and side wall portion external of said intermediate and lower die means and form a first projection and second projection at an inner side of said intermediate in a manner that said first projection is disposed at a point corresponding to said retained area and said second projection is disposed above said first projection;

an upper die means mounted on said intermediate die means;

said intermediate and upper die means cooperating to provide means for forming a foam cushion member so that said lower, intermediate and upper die means define a hollow therewithin and above said trim cover assembly to permit foaming to be effected in said hollow to form said foam cushion member integrally with said trim cover assembly such that said retained area of said trim cover assembly, said terminal end of said seating surface portion thereof and said side wall portion thereof are isolated by said first projection from said foam cushion.

9. The apparatus of claim 6, wherein said first projection is formed to have a surface conforming in shape to a recess of a slope created in said retained area of said peripheral end portion of said trim cover assembly, said recess being created due to pressure of said intermediate die means upon said retained area associated with said trim cover assembly, and wherein said second projection is formed to have a surface by which there is formed a recess in said foam cushion member, said recess being so adapted that, at termination of said foaming, said side wall portion of said trim cover assembly is pulled downwardly along a side wall of said foam cushion member and said terminal end of said seating surface portion of said trim cover assembly is folded inwardly and received in said recess, so that said terminal end is prevented from being projected from said side wall of said foam cushion member and therefore said side wall portion of said trim cover assembly is attached evenly on said side wall of said foam cushion member.

10. The apparatus of claim 6, wherein said intermediate die means comprises three separate die pieces which may be fitted together and separated from one another, each of said pieces having a side wall of an outwardly arcuate section, and wherein said upper die means is formed with an injection port through which a base foaming material is injected.

* * * * *